United States Patent Office 3,394,375
Patented July 23, 1968

3,394,375
AUTOMATIC TRACKING SYSTEM FOR LINEARLY POLARIZED ELECTROMAGNETIC WAVES
David G. Vice and Thomas W. J. Kennedy, Ottawa, Ontario, Canada, assignors to Northern Electric Company Limited, Montreal, Quebec, Canada
Filed Nov. 4, 1966, Ser. No. 592,067
7 Claims. (Cl. 343—100)

ABSTRACT OF THE DISCLOSURE

A system for tracking a source of linearly polarized radio signals of random orientation which includes a directional antenna having a rotatable polarizer for converting the received linearly polarized signals to circularly polarized ones. A circular waveguide feed system for the antenna receives both right and left hand $TE_{11}$ mode signals, and left hand $TM_{01}$ mode signals. The left hand $TE_{11}$ and $TM_{01}$ mode signals yield azimuth and elevation tracking information for controlling the direction of the antenna; while the right and left hand $TE_{11}$ mode signals yield polarization information for controlling the rotation of the polarizer so that the received linearly polarized signals are transformed to left hand circularly polarized ones.

---

This invention relates to a system for tracking a source of linearly polarized electromagnetic waves and is particularly applicable for tracking and receiving microwave signals transmitted from a satellite which may have any random oriented linear polarization relative to a ground station.

Since the advent of satellite communications, a number of systems have been proposed for automatically tracking and receiving signals that are transmitted from an active satellite or reflected from a passive one. At all times, sufficient tracking information must be derived from either the information signal or from beacon signals radiated from the satellite in order that the ground station antenna can be oriented towards it. One such system, utilizing circular polarization, has been described in an article entitled "The Autotrack System," by J. S. Cook and R. Lowell; Bell System Technical Journal, July 1963, part II, pages 1283–1307. In such a system, either circular or elliptical polarized signals may be tracked by comparing the phase and amplitude of the horizontal and vertical components of the dominant mode of a beacon signal against that of a higher order mode. This information provides two orthogonally directed error signals which may be utilized to control the azimuth and elevation settings of the tracking antenna. Such a system performs satisfactorily for circularly polarized signals or low ellipticity signals. However, for high ellipticity signals or linearly polarized signals, very little or no tracking information is generated orthogonal to the plane of polarization. Hence, the higher order mode will not be excited and no error indication will be generated. Thus, the antenna will not track along this plane and the target satellite will tend to slip away.

In some instances, it is desirable to utilize linear polarization in satellite communications. However, this leads to the additional problem that not only must the satellite be tracked in azimuth and elevation; but the receiving antenna, and for that matter the transmitting antenna, of the ground station must be properly polarized with respect to that of the satellite or cross polarization may occur with a resultant large loss of signal strength.

One type of antenna which is used in satellite communications is a horn reflector antenna such as disclosed in United States Patent No. 2,416,675, issued Mar. 4, 1947, and invented by A. C. Beck et al. In the Telstar satellite communications project conducted in 1962, horn-paraboloid antennas of this type were used at the ground stations in both the United States of America and France. Such an antenna has received wide acceptance as a broadband microwave antenna due to its extremely low-noise temperature properties, high directivity and low back-radiation.

However, when a large horn-reflector antenna of the type described above is used, the problems of tracking a linearly polarized randomly oriented signal source are multiplied, since it must remain oriented and aligned to the signal source. The antenna could be constructed with the transmitting and receiving equipment mounted on the apex of the horn, with means provided for orienting the antenna in azimuth, elevation and also for rotating it about its boresight axis. While it is a relatively practical matter to mount such an antenna so that it can be oriented in azimuth and elevation (which suffices for circular polarization), it becomes difficult and expensive to also provide means for rotating the antenna about its boresight axis (as is necessary when linear polarization is used) while maintaining the desired structural rigidity and tracking accuracy.

It has been discovered that by providing a rotatable polarizer for converting the received linearly polarized signals to circularly polarized ones, the difficult and costly requirement of having to rotate the antenna about its boresight axis, in order to receive linearly polarized waves, is eliminated. By providing a rotatable polarizer, the incoming linearly polarized waves can always be received no matter what the polarization of the satellite antenna is relative to that of the ground station. Sufficient tracking information can be derived from the incoming signals for automatically orienting and aligning the antenna to the satellite or any other linear signal source.

In accordance with the present invention there is provided a system for tracking linearly polarized electromagnetic waves radiated from a signal source comprising: a directional antenna, having a feed system for receiving circularly polarized electromagnetic waves of a dominant mode and a higher order mode. In addition, the directional antenna includes a rotatable polarizer for converting the linearly polarized electromagnetic waves to circularly polarized ones. Means are provided for deriving from the feed system first and second signals which are proportional to each sense of circular polarization of the dominant mode (i.e. right-hand and left-hand circular polarization); and also for deriving a third signal which is proportional to the received signal of the higher order mode. In addition, the system comprises means responsive to the relative phase and amplitude of the first and second signals for rotating the rotatable polarizer to nullify the second signal; and means responsive to the relative phase and amplitude of the first and third signals for orienting the directional antenna towards the signal source.

While the invention is applicable to many forms of antennas, in one embodiment of the invention, the antenna is of a conical horn-reflector type in which the rotatable polarizer is located across the mouth thereof. The feed end of the horn-reflector is connected through a rotatable coupler to a circular waveguide which forms part of the feed system. Means are included in the feed system for detecting both right-hand and left-hand circularly polarized signals excited in the dominant or $TE_{11}$ mode. In addition, the feed system includes means for detecting circularly polarized signals excited in the first higher order or $TM_{01}$ mode.

If the polarizer axis is oriented at an angle of 45° relative to that of the incoming linearly polarized signal, circularly polarized waves of one sense (i.e. left-hand) will be produced in a well-known manner. On the other hand, if the polarizer axis is displaced at an angle of 45° on the other side of the plane of polarization of the incoming linearly polarized signals, the other sense (i.e. right-hand) of circular polarization will be produced. In between, varying degrees of elliptical polarization will be produced and if the polarizer is aligned with the incoming signal or at an angle of $\pi/2$ radians to it, the waves will pass through unaffected. As is well known in the art, every ellipitcally or linearly polarized signal can be resolved into two orthogonal components, the relative amplitude of which determines the ellipticity of the resultant wave. Thus, when the two components are equal in amplitude, either right-hand or left-hand circular polarization will result. When one component is zero, linear polarization will result. By comparing the relative amplitudes of the right-hand and left-hand circularly polarized vectors produced by the received linearly polarized signals which pass through the polarizer, the alignment of the polarizer may be controlled so that one vector (for instance the right-hand vector) is nulled out and only left-hand circular polarization will be produced in the feed system.

As explained in the above mentioned article by J. S. Cook et al., to provide both horizontal and vertical tracking information, it is necessary to derive two signals which are proportional to the orthogonal components of the dominant $TE_{11}$ mode, and one signal which is proportional to a higher order mode such as the $TM_{01}$ mode. By comparing the phase and amplitude of the $TM_{01}$ mode against each of the $TE_{11}$ modes, horizontal and vertical tracking information can be derived. When the signal is of circular polarization, the orthogonal components of the $TE_{11}$ mode are identical but displaced by $\pi/2$ radians in phase. Thus, it is noly necessary to sample one orthogonal component, the other can then be generated with a $(2n-1)\pi/2$ phase shifter, where: $n$ is any integer. In this way, a two-channel processing system, such as described commencing on page 1295 of the above-mentioned Cook et al. article, can be used to produce the azimuth and elevation tracking information. Since the rotatable polarizer is being continuously aligned to provide complete linear to circular polarization conversion, such a two channel processing system in conjunction with the polarizer will provide automatic and complete tracking of a linearly polarized signal of any polarization sense and orientation.

If it is desired to simultaneously transmit and receive signals utilizing the same system, it is only necessary to couple to the feed system a transmitter signal of circular polarization. When the circularly polarized transmitter signal passes through the polarizer it will emerge as a linearly polarized wave. Since the antenna and its feed system are inherently broad band, signals such as used for transmitting and receiving video information can be readily radiated and tracked using a single aperture antenna.

An example embodiment of the invention will now be described with reference to the accompanying drawings in which.

Figure 1:
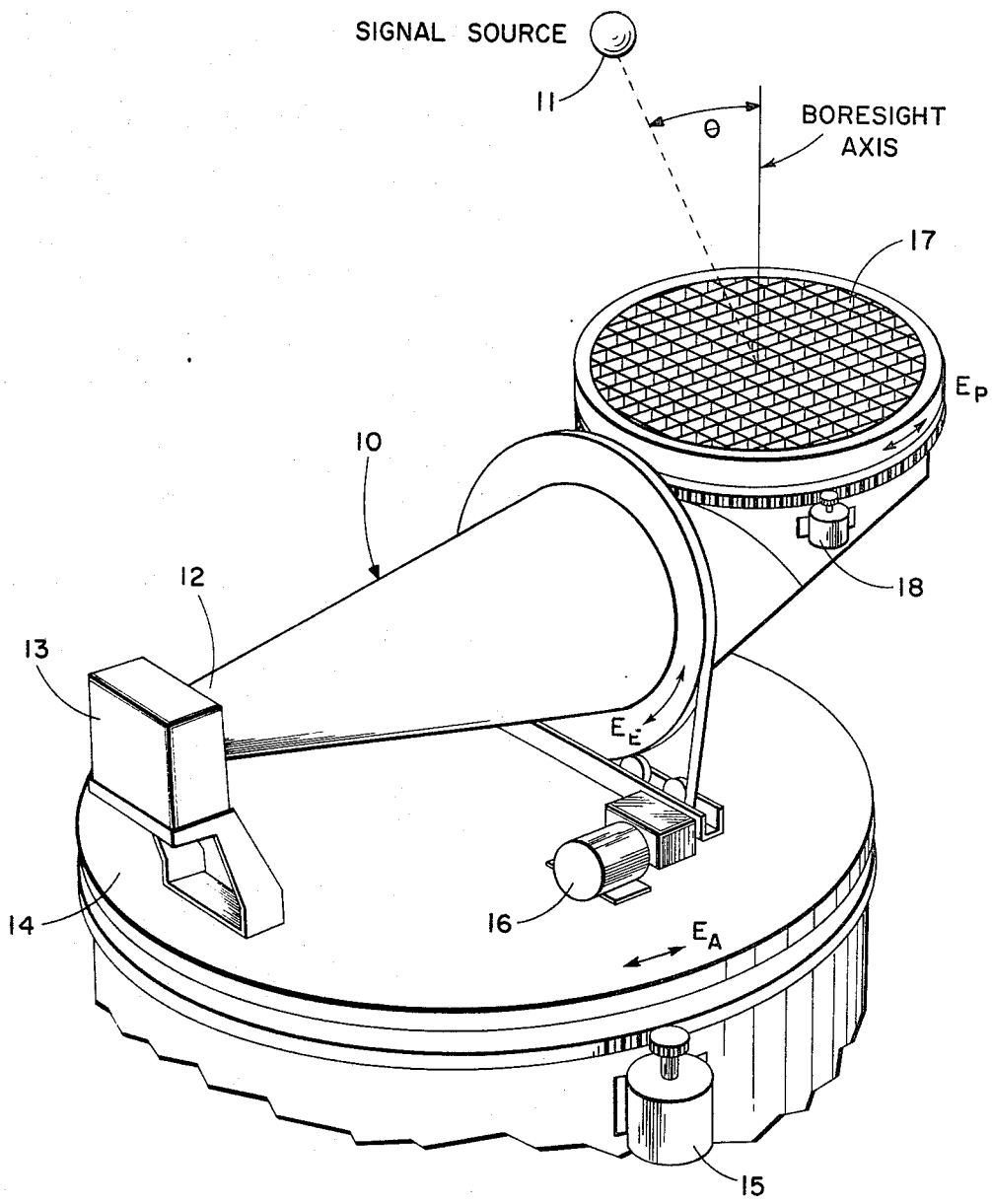
FIGURE 1 is a perspective view of an antenna which forms part of a tracking system of the present invention.

Referring to FIGURE 1, the tracking system comprises a conical horn-reflector antenna 10 which may be used for tracking linearly polarized electromagnetic waves radiated from a signal source such as a satellite 11. The feed end 12 of the antenna 10 is coupled to a feed system which together with the balance of the tracking system, a receiver and transmitter are located in a housing 13. The antenna 10 and the housing 13 are mounted on a rotatable azimuth platform 14, the rotation of which is controlled by an azimuth drive system 15 which in turn is responsive to an azimuth error signal $E_A$ generated by the tracking system. The conical horn-reflector antenna 10 is pivotally mounted about its longitudinal axis so that the boresight axis may be oriented in elevation. The elevation angle of the antenna 10 is controlled by an elevation drive system 16 which is responsive to an elevation error signal $E_E$.

A rotatable polarizer 17 for converting incoming linearly polarized waves to circularly polarized ones, is rotatably mounted across the mouth of the antenna 10. The phase angle which the axis of the polarizer 17 makes with respect to that of the incoming linearly polarized signals is controlled by a polarization drive system 18 which is responsive to a polarization error signal $E_P$.

Throughout the specification, the designation "dominant" will be used for $TE_{11}$ mode signals since these have the longest cut-off wavelength in circular waveguide. Likewise, the designation "first higher order" will be used for $TM_{01}$ mode signals which have the second longest cut-off wavelength. As further explained with reference to FIGURE 3, the $TE_{11}$ mode is maximally excited when the signal source is on the boresight axis, while the $TM_{01}$ mode is only excited when the signal source is off the boresight axis of the antenna 10.

Figure 2:
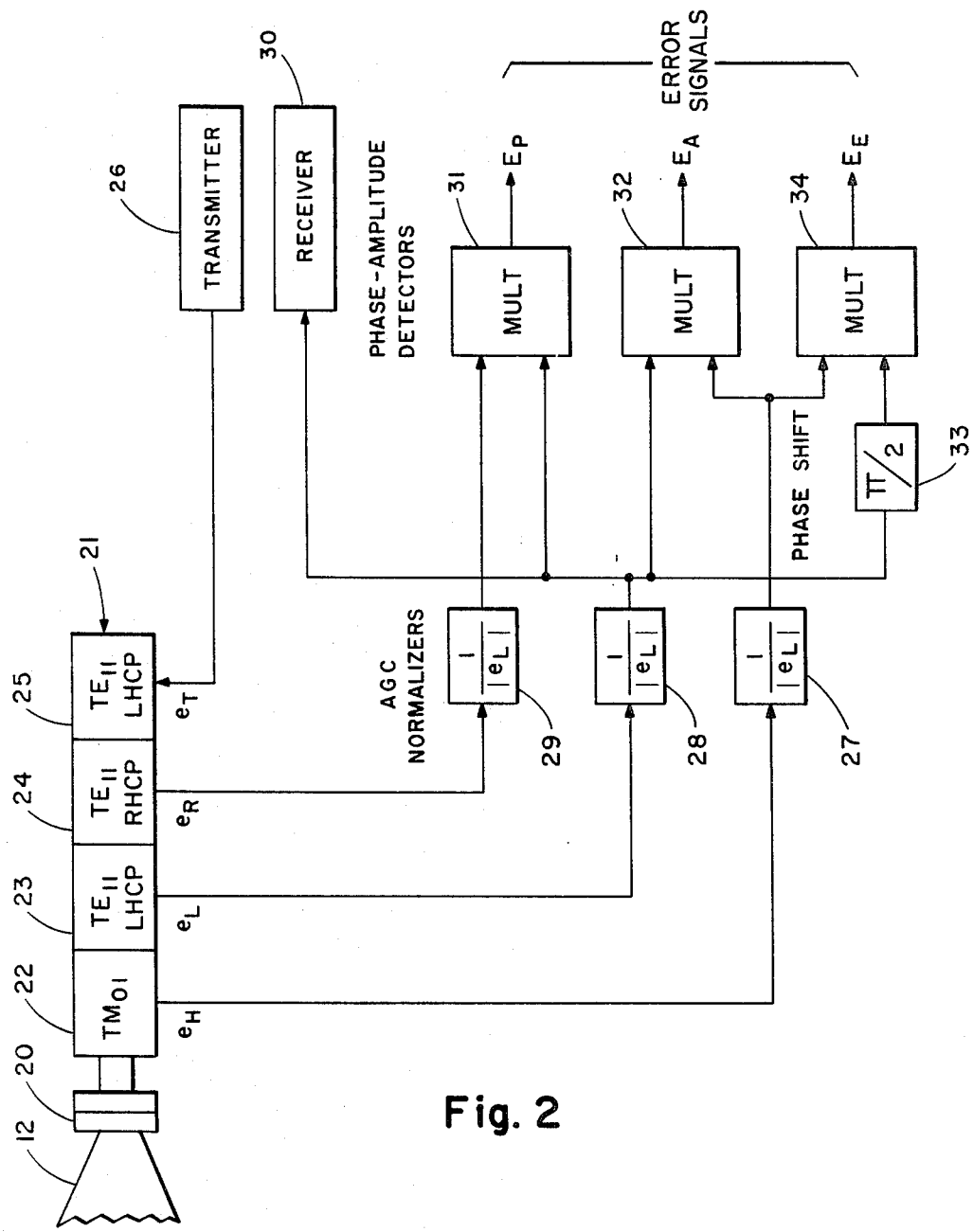
FIGURE 2 is a block schematic diagram of the electrical equipment forming part of the invention and provides error signal which are used to control the orientation of the antenna illustrated in FIGURE 1.

Referring to FIGURE 2, the feed end 12 of the antenna 10 is coupled through a rotatable coupler 20 to the feed system, generally 21. The feed system 21 comprises a $TM_{01}$ mode coupler 22 which couples the first higher order mode signals $e_H$ received from the signal source 11 and generated in the feed system 21 by incoming signals which are off the boresight axis. A $TE_{11}$ left hand circular polarization (LHCP) coupler 23 couples dominant signals $e_L$ received from the signal source 11 which are on the boresight axis when the rotatable polarizer 17 is properly oriented. A $TE_{11}$ right-hand circular polarization (RHCP) coupler 24 coupels dominant signals $e_R$ from the antenna 10 when the signal source 11 is on the boresight axis and the rotatable polarizer 17 is improperly aligned with the received signals. The feed system 21 also includes a $TE_{11}$ left-hand circular polarization coupler 25 for coupling signals $e_T$ from a transmitter 26 to the antenna 10.

Each of the signals $e_H$, $e_L$, and $e_R$, generated by the couplers 22, 23 and 24 are coupled from the feed system 21 to automatic gain control normalizers 27, 28 and 29 respectively. The function of the normalizers 27, 28 and 29 is to ensure that each output signal therefrom is proportional to the relative received signal strength of each of the received signals in the antenna 10. Since the left-hand circular polarized signal $e_L$ generated by the $TE_{11}$ coupler 23 is utilized as a reference signal, the gain of each of the normalizers 27 to 29 is made equal to $1/e_L$.

The output from the normalizer 28 is connected directly to a receiver 30, one input of a phase-amplitude detector 31, one input of a phase-amplitude detector 32, and through a $\pi/2$ phase shift network 33 to one input of a phase-amplitude detector 34. The output from the normalizer 29 is connected to the other input of the phase-amplitude detector 31, while the output of the normalizer 27 is connected directly to the other inputs of each of the detectors 32 and 34. Each of the detectors 31, 32 and 34 multiplies the two input signals thereto so as to produce at the output of the detector 31 a polarization error signal $E_P$, at the output of the detector 32 an azimuth error signal $E_A$, and at the output of the detector 34 an elevation error signal $E_E$. These error signals $E_A$, $E_E$ and $E_P$ are used to control the drive systems 15, 16 and 18 respectively illustrated in FIGURE 1.

Figure 3:
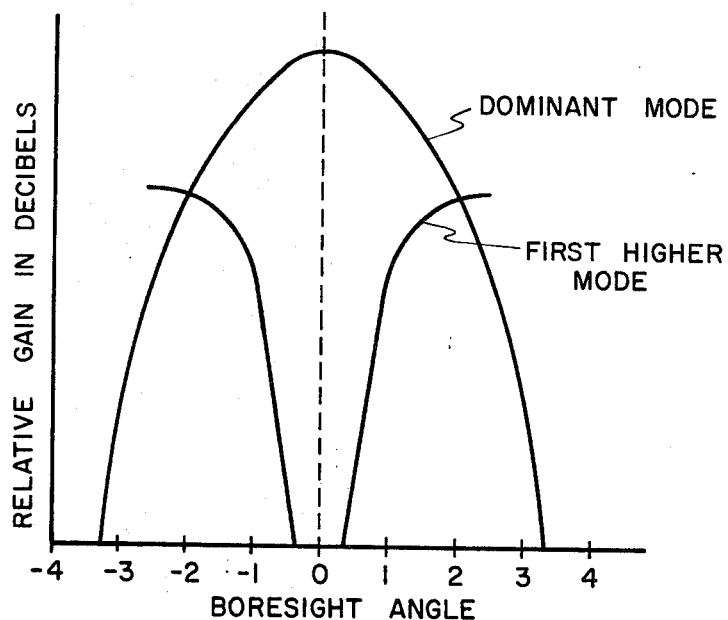
FIGURE 3 is a graph of relative gain versus boresight angle for various modes excited in a feed system for the antenna of FIGURE 1 by the received signals.

FIGURE 3 illustrates typical radiation patterns for an open-ended circular waveguide, which are very similar to the actual radiation patterns of the conical horn-reflector antenna 10. Since the $TE_{11}$ or dominant mode is asymmetrical about the circular waveguide axis, maximum excitation exists when the signal source, such as the satellite 11 of FIGURE 1, is on the boresight axis. On the other hand, because the $TM_{01}$ or higher order mode is symmetrically excited in the antenna 10, a deep null in signal strength occurs for this mode when the signal source 11 is on the boresight axis. Off the axis, excitation of opposite phase increases until a maximum is reached. As can be seen from FIGURE 3, the dominant signal does not very appreciably for small boresight angles $\theta$. Hence this signal can be readily used as the reference signal in the normalizers 27 to 29.

Figure 4:
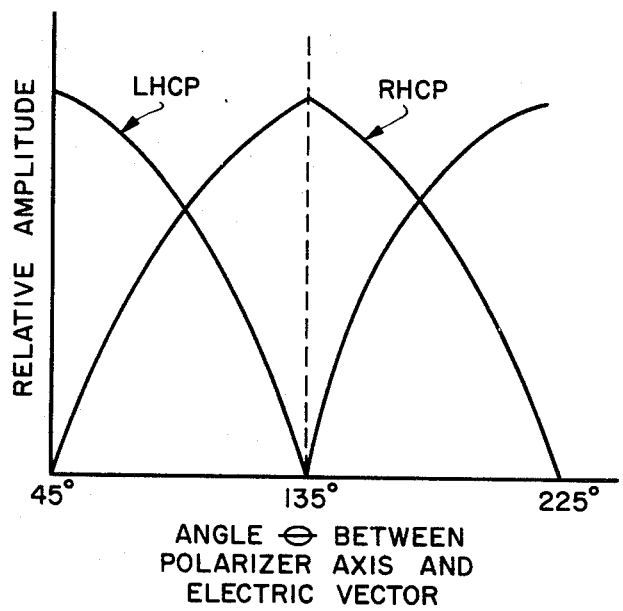
FIGURE 4 is a graph of relative gain versus phase angle for the two senses of circular polarization excited in the feed system of the antenna of FIGURE 1.

FIGURE 4 illustrates the relative gain versus phase angle between the axis of the polarizer 17 and the electric vector of the linearly polarized signal received from the signal source 11 of FIGURE 1. When the axis of the polarizer 17 is oriented at 45° relative to the electric vector of the received signal, maximum excitation in the left-hand circular polarization coupler 23, of FIGURE 2, will be obtained while at the same time minimum excitation of the right-hand circular polarization coupler 24 will result. If the polarizer 17 is now displaced an additional 90° such that it is 135° from the axis of the electric vector, maximum excitation in the right-hand circular polarization coupler 24 will be obtained and minimum excitation in the left-hand circular polarization coupler 23. If the polarizer 17 is shifted another 90° to the 225° point relative to the electric vector, again maximum excitation in the left hand circular polarization coupler 23 will result. At the 45°, 135° and 225° points, the received linearly polarized signals will be converted to circularly polarized ones. Between these points, varying degrees of elliptically polarized signals will be produced. When the amplitude of the signal in both the left-hand and right-hand circular polarization couplers 23 and 24 is equal, the axis of the polarizer 17 will be parallel or perpendicular to the electric vector of the incoming signal and it will pass through unchanged.

Referring to FIGURES 1 to 4, during operation of the tracking system, linearly polarized electromagnetic waves received from the signal source 11 pass through the polarizer 17 where they are reflected and directed by the conical horn-reflector antenna 10 through the rotatable coupler 20 to the feed system 21. Signals which are on or near the boresight axis excite $TE_{11}$ signals which are coupled from either the LHCP coupler 23 or the RHCP coupler 24 as dominant signals $e_L$ or $e_R$ respectively. In addition, if the signal source 11 is off the boresight axis by an angle $\theta$, $TM_{01}$ signals are excited in the feed system 21 which are coupled from the coupler 22 to the normalizer 27 as a higher mode signal $e_H$.

Each of the received signals $e_H$, $e_L$, and $e_R$, are amplified by the normalizers 27, 28 and 29 respectively. When the antenna 10 is properly oriented with the signal source 11 and the polarizer 17 correctly aligned, only left-hand circularly polarized signals of the $TE_{11}$ mode will be excited in the feed system 21. Thus, the receiver 30 will receive the maximum signal from the output of the normalizer 28. When the signal source is off the boresight axis in either azimuth or elevation by an angle $\theta$, higher mode signals $e_H$ will be coupled from the $TM_{01}$ coupler 22. On the other hand, when the polarizer 17 is not properly aligned with the signal source 11, some righthand circularly polarized signals will be excited generating a signal $e_R$ which is coupled to the normalizer 29.

The error signals from the normalizers 28 and 29 are multiplied in the phase-amplitude detector 31 to produce a varying D–C error signal $E_P$. This signal is used to control the polarization drive system 18 which rotates the polarizer 17 so as to nullify the signal $e_R$ coupled from the right-hand circular polarization coupler 24.

Since the polarizer 17 is being continuously adjusted to excite only left-hand circularly polarized signals in the feed system 21, a two-channel processing system can be used for generating the azimuth and elevation error signals. To do this, the dominant signal $e_L$ and the higher mode signal $e_H$ are multiplied directly in the phase-amplitude detector 32 which produces at its output an azimuth error signal $E_A$. This signal is used to control the azimuth drive system 15 which rotates the antenna 10 until the horizontal component of the boresight axis is pointed towards the signal source 11.

By phase shifting the reference signal $e_L$ by 90° in the phase shift network 33, a signal which is proportional to the orthogonal component of the signel $e_L$ is obtained. This signal is then multiplied with the difference signal $e_H$ from the normalizer 27 in the phase-amplitude detector 34 to produce at its output an elevation error signal $E_E$. The elevation error signal $E_E$ is used to control the elevation drive system 16 which orients the antenna 10 so that the vertical component of the boresight axis is pointed towards the signal source 11.

To simultaneously transmit signals from the transmitter 10 to the signal source or satellite 11, signals are coupled through a $TE_{11}$ left-hand circular polarization coupler 25. They are then transmitted from the feed system 21 through the rotatable coupler 20, the antenna 10 and after passing through the polarizer 17, emerge as linearly polarized electromagnetic waves orthogonal to those of the received signals from the source 11. If it is desired to transmit signals which are of the same polarization as the received signals, it is only necessary to change the left-hand circular polarization coupler 25 to a right-hand circular polarization coupler.

Figure 5:
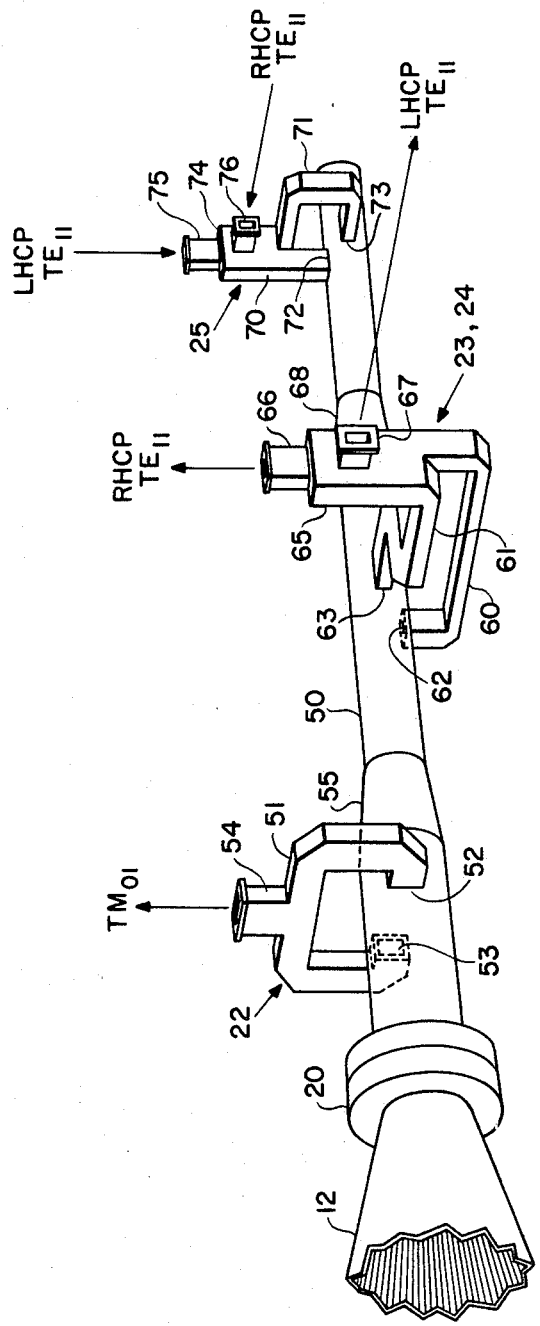
FIGURE 5 is a perspective view of the feed system used to feed the antenna of FIGURE 1.

FIGURE 5 illustrates a perspective view of the feed system 21. The feed system 21 comprises a circular waveguide 50 which is coupled to the feed end 12 of the antenna 10 of FIGURE 1, through the rotatable coupler 20. The rotatable coupler 20 does not affect the operation of the tracking system since only circularly polarized signals will be excited in the circular waveguide 50 when the polarizer 17 is correctly aligned with respect the incoming linearly polarized signals. While a rotatable coupler 20 is used in the present embodiment, the feed end 12 may be rigidly affixed to the feed system 21 which in turn is connected to the transmitter 26, the receiver 30 and the tracking equipment of FIGURE 2.

The $TM_{01}$ mode coupler, generally 22, comprises a rectangular waveguide 51 which is symmetrically coupled to the waveguide 50 through diametrically opposed ports 52 and 53 so that the wide dimension of the rectangular waveguide 51 is orthogonal to the longitudinal axis of the waveguide 50. Coupled to the center of the waveguide 51 is a shunt T 54.

Magnetic fields of the $TM_{01}$ mode will be coupled through the ports 52 and 53 exciting signals in the waveguide 51. These signals will meet in phase at the shunt T 54 thereby providing the signal $e_H$ at the output of the coupler 22. Electric fields from the $TE_{11}$ mode will also excite signals in the waveguide 51 but in opposite polarity at each of the ports 52 and 53. These signals will meet out of phase at the shunt T 54 where they will cancel. Hence, only $TM_{01}$ signals from the waveguide 50 will be coupled from the coupler 22.

As is well known in the art, the cut-off wavelength for $TE_{11}$ mode signals is approximately 1.706 times the diameter of circular waveguide; and for the $TM_{01}$ mode, the cut-off wavelength is approximately 1.306 times the diameter of the guide. By diminishing the diameter of the circular waveguide 50 at a constriction 55 to less than the cut-off wavelength of the $TM_{01}$ mode, only received signals of the $TE_{11}$ mode will be propagated beyond the $TM_{01}$ coupler 22.

In the present embodiment, the LHCP coupler, generally 23, and the RHCP coupler, generally 24, comprise a common coupling assembly having two rectangular waveguides 60 and 61 which are orthogonally coupled at one end to the circular waveguide 50 through the ports 62 and 63 respectively, so that the wide dimension of the rectangular waveguides 60 and 61 is parallel to the longitudinal axis of the circular waveguide 50. The other ends of the waveguides 60 and 61 are connected to a hybrid magic tee 65 which has a shunt arm 66 and a series arm 67.

Since the magnetic field of the $TE_{11}$ mode siganls is parallel to the wide dimension of the waveguides 60 and 61, both left-hand and right-hand circularly polarized signals of this mode will be coupled from the waveguide 50 through the ports 62 and 63.

By design, the electrical length of the waveguide 61 is made 90 degrees longer than that of the waveguide 60. Since the coupling ports 62 and 63 are disposed orthogonal to each other (which adds an additional 90 degrees phase shift) received left-hand circularly polarized signals coupled from the two ports 62 and 63 will arrive as the magic tee 65, 180 degrees out of phase. These two signals will then add in phase in the series arm 67 of the hybrid 65, thereby providing a left-hand circularly polarized signal of the $TE_{11}$ mode at its output. On a similar basis, right-hand circularly polarized signals which are coupled from the orthogonal ports 62 and 63 will arrive in phase at the hybrid 65, and thereby be coupled from the shunt arm 66.

By providing a further constriction 68 of the waveguide 50 beyond the couplers 23 and 24, received signals of the $TE_{11}$ mode are prevented from propagating further along the waveguide 50. By proper phasing of the constriction 68, relative to the couplers 23 and 24, the $TE_{11}$ mode signals will be reflected in phase. Thus, all the received signal power in this mode will be coupled from either of the couplers 23 or 24.

The $TE_{11}$ mode coupler 25 for coupling signals from the transmitter 26 to the feed system 21, is similar in design to that of the couplers 23 and 24. The coupler 25 comprises rectangular waveguides 70 and 71 which are orthogonally coupled to the waveguide 50 through coupling ports 72 and 73 respectively, so that the wide dimension of the waveguide 70 and 71 is parallel to the longitudinal axis of the circular waveguide 50. Each of the waveguides 70 and 71 are connected to a magic Tee 74, which has a shunt arm 75 and a series arm 76, so that the waveguide 70 is 90 degrees longer than the waveguide 71.

When transmitter signals are coupled to the series arm 76, left-hand circularly polarized signals will be excited in the waveguide 50. During this interval, the shunt arm 75 would be terminated in a dummy load (not shown). When the left-hand circularly polarized signals from the coupler 25 pass through the rotatable polarizer 17, they will emerge as linearly polarized signals which are orthogonal to the received signals from the satellite 11.

If it is desired to have transmitter signals which are of the same polarity as the received signals, the transmitter 26 is connected to the shunt arm 75 and the dummy load (not shown) to the series arm 76. This excites right-hand circularly polarized signals in the waveguide 50 which after passing through the rotatable polarizer 17 emerge with the same polarity as the received signals.

In the above described embodiment, the transmitter signal frequency must be greater than that of the received signals in order to pass through the constriction 68. By reversing the frequency relationship, the coupler 25 can be used for receiving signals while either the coupler 23 or 24 can be used for transmitting signals.

In order to prevent transmitter signals from entering the couplers 22 to 24, dielectric windows (not shown) are placed in the ports 52, 53, 62 and 63. The dimensions of the windows are chosen so that they are transparent to the incoming received signals, but appear as a R-F block to the higher frequency transmitter signals.

Figure 6:
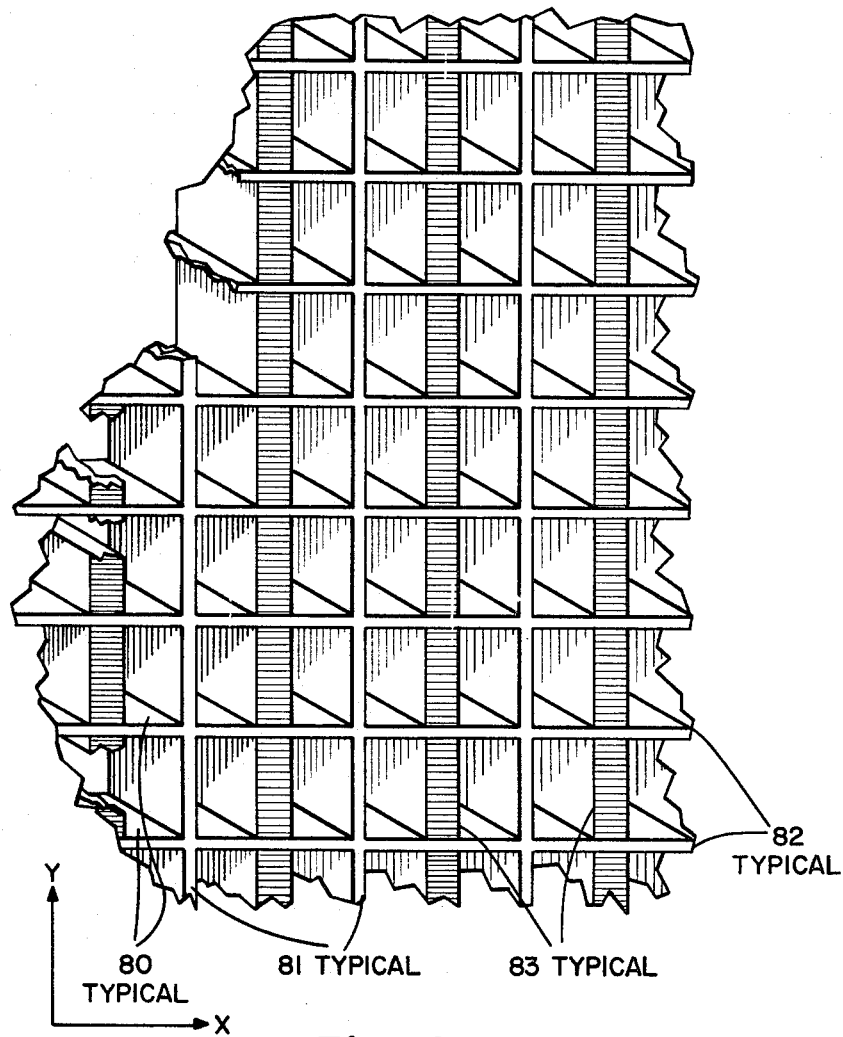
FIGURE 6 is a perspective view of a portion of a polarizer which forms part of the antenna of FIGURE 1.

FIGURE 6 illustrates a section of the polarizer 17 which comprises an array of rectangular cells, typically 80, formed from a plurality of thin metal walls 81 and 82 affixed orthogonal to each other. Each of the cells 80 acts as a section of rectangular waveguide with the X dimension of each cell 80 being slightly greater than the Y dimension. Running orthogonal to the X dimension through the center of each cell is a dielectric plate 83.

To produce circular polarization, the incoming field must be oriented at an angle of 45 degrees relative to the Y axis of each cell. As the signal passes through the cells 80, the signal component parallel to the X dimension exhibits a phase lead over that component parallel to the Y dimension. This phase lead is greater than inversely proportional to frequency. However, the dielectric plate 83 produces a differential phase lead versus frequency which is opposite to that obtained in the cells 80 thereby resulting in a compensating effect. Since the dielectric plates 83 are orthogonal to the X axis, the signal component parallel to it is little affected by the plates 83. However, due to the plates 83, the signal component parallel to the Y axis has a phase lag which increases greater than proportionally with frequency. Both these effects are proportional to the depth of the cells 80 and therefore they are designed to produce a $(2N-1)\pi/2$ radian phase difference between the orthogonal components, where N is an integer. This results in conversion from linear to circular polarization over a broad frequency range.

If the incoming linearly polarized signal arrives from a direction off the boreside axis of the antenna, both $TE_{11}$ and $TM_{01}$ mode circularly polarized signals will be excited in the circular waveguide 50. If the polarizer 17 is correctly aligned with the incoming signal only left-hand circularly polarized signals will be present in the waveguide 50. However, when the polarizer 17 is incorrectly aligned, some right-hand circular polarization component will be present also.

In the above-described embodiment, the antenna 10 was of conical horn-reflector type. The present invention may incorporate this antenna 10 as the feed element for a Cassegrain system employing a hyperbolic sub reflector and a parabolic main reflector.

What is claimed is:

1. A system, for tracking linearly polarized electromagnetic waves radiated from a signal source, comprising: a directional antenna, including a feed system for receiving circularly polarized elemtromagnetic waves of the dominant mode and a higher order mode; said directional antenna also including a rotatable polarizer for converting said linearly polarized electromagnetic waves to said circularly polarized electromagnetic waves; means for deriving from said feed system a first signal and a second signal proportional to said circularly polarized electromagnetic waves of the dominant mode having one sense of circular polarization and the other sense of circular polarization respectively; means for deriving from said feed system a third signal proportional to said circularly polarized electromagnetic waves of the higher order mode; means, responsive to the relative phase and amplitude of said first and second signals, for rotating said rotatable polarizer to nullify said second signal; and means responsive to the relative phase and amplitude of said first and third signals for orienting said directional antenna towards said signal source.

2. A system as defined in claim 1 in which the feed system includes a circular waveguide for receiving said circularly polarized electromagnetic waves and in which the dominant mode is of the $TE_{11}$ type and the higher order mode is of the $TM_{01}$ type.

3. A system as defined in claim 2 in which the antenna includes a conical horn-reflector and in which the rotatable polarizer is located across the mouth thereof.

4. A system as defined in claim 3 in which the conical horn-reflector is rotatably coupled to one end of said circular waveguide.

5. A system as defined in claim 1 in which the means, responsive to the realtive phase and amplitude of said first and second signals, for rotating said rotatable polarizer to nullify said second signal comprises: means for normalizing said second signal relative to said first signal; means for multiplying said first and second signals to produce a polarization error signal; and means responsive to said polarization error signal for rotating said polarizer.

6. A system as defined in claim 5 in which the means responsive to the relative phase and amplitude of said first and third signals for orienting said directional antenna towards said signal source comprises: means for normalizing said third signal relative to said first signal, means for multiplying said first and third signals to produce an azimuth error signal and an elevation error signal; and means responsive to said azimuth and elevation error signals for orienting said directional antenna.

7. A system as defined in claim 1 in which the rotatable polarizer comprises a plurality of contiguous, coextensive, open ended rectangular cells of electrically conductive material, each of said cells having a dielectric plate located therein in a plane parallel to the narrow walls of said cells; the electrical length at a predetermined frequency of each of said cells in combination with each of said dielectric plates for an electromagnetic wave polarized parallel to said narrow walls being $(2N-1)\pi/2$ radians longer than the electrical length of such a wave polarized orthogonal to said narrow walls, where N is an integer.

References Cited
UNITED STATES PATENTS

| | | | |
|---|---|---|---|
| 3,089,137 | 5/1963 | Pierce | 343—100 |
| 3,259,899 | 7/1966 | Cook | 343—100 X |
| 3,310,805 | 3/1967 | Viglietta et al. | 343—100 |

RICHARD A. FARLEY, *Primary Examiner.*

T. H. TUBBESING, *Assistant Examiner.*